(12) United States Patent
Lafferty et al.

(10) Patent No.: US 8,312,826 B2
(45) Date of Patent: Nov. 20, 2012

(54) ALIGNMENT MECHANISMS FOR MATERIALS JOINED AT A SEAM

(75) Inventors: Lola Lafferty, Capac, MI (US); Etienne Poulet, Saint Bresson (FR); Leonardo Gomes, Rochester Hills, MI (US)

(73) Assignee: Faurecia Automotive Seating, LLC, Troy, MI (US)

( * ) Notice: Subject to any disclaimer, the term of this patent is extended or adjusted under 35 U.S.C. 154(b) by 132 days.

(21) Appl. No.: 12/850,766

(22) Filed: Aug. 5, 2010

(65) Prior Publication Data

US 2012/0031317 A1    Feb. 9, 2012

(51) Int. Cl.
*D05B 1/00*    (2006.01)
(52) U.S. Cl. .................................. 112/475.01
(58) Field of Classification Search .................. 112/440, 112/441, 470.27, 475.01, 475.08, 475.12, 112/475.17
See application file for complete search history.

(56) References Cited

U.S. PATENT DOCUMENTS

| | | | |
|---|---|---|---|
| 4,250,822 A * | 2/1981 | Fickers | 112/475.17 |
| 4,425,391 A | 1/1984 | Wilson | |
| 4,875,423 A * | 10/1989 | Conti | 112/438 |
| 5,236,243 A * | 8/1993 | Reyes | 297/219.1 |
| 5,501,165 A * | 3/1996 | Nagashima | 112/475.06 |
| 6,935,260 B2 * | 8/2005 | Kromm et al. | 112/475.08 |
| 2004/0154511 A1 | 8/2004 | Takei et al. | |

FOREIGN PATENT DOCUMENTS

| | | |
|---|---|---|
| EP | 2283749 | 2/2011 |
| GB | 2438163 | 11/2007 |

OTHER PUBLICATIONS

European Search Report, dated Dec. 15, 2011, for European Application EP11005702.

* cited by examiner

*Primary Examiner* — Tejash Patel
(74) *Attorney, Agent, or Firm* — Reising Ethington P.C.

(57) ABSTRACT

Alignment mechanisms are provided for use in conjunction with manufacture of a flat-seam construction made up of a number of sequentially formed stitches and formed on a portion of one or more stitchable materials.

24 Claims, 7 Drawing Sheets

ALIGNMENT MECHANISMS FOR MATERIALS JOINED AT A SEAM

BACKGROUND

The present disclosure relates to upholstery, and particularly to upholstery stitching apparatus and processes. More particularly, the present disclosure relates to alignment of two materials to be stitched to produce automotive upholstery.

Automotive upholstery applications, excluding seating applications, very often employ a soft, relatively thin textile or leather cover positioned over a substrate material constructed from a less flexible material, such as metal, plastic, foam, or the like. Automotive seating applications, being a specialized subset of automotive upholstery applications, typically comprise a soft cover mounted on an inner substrate constructed from a resilient foam material. In either automotive upholstery application, the soft cover is usually formed from a number of parts stitched to each other by seams along join lines. In automotive seating applications, the threads of the seams are often adapted to attach to portions of the foam substrate material below, thereby holding the cover in a fixed position on the underlying foam substrate. In non-seating applications, the soft cover may be attached by other attachment means, such as, for example, adhesives, clips, and staples.

SUMMARY

In accordance with the present disclosure, first and second stitchable materials are joined at a seam with stitches. Thread is used in a sewing process to produce a series of stitches coupled to the first and second stitchable materials.

In illustrative embodiments, alignment markings are applied to one or more of a top surface, a bottom surface, or an edge of a first stitchable material. Each alignment marking is a line in an illustrative embodiment. Each alignment line on a first stitchable material can be placed next to a companion notch or other suitable alignment feature formed in or on a neighboring second stitchable material to align the first and second stitchable materials properly with one another during a sewing operation. In that operation, the aligned first and second stitchable materials are joined with stitches.

In illustrative embodiments, a line-and-notch alignment system in accordance with the present disclosure is used to facilitate and support a multi-needle (flat) seam that joins a first stitchable material that is arranged to extend over and cover an edge of a neighboring second stitchable material to lie in overlapping and flat relation to the second stitchable material. In a flat seam, multiple needles are used to form stitches that extend across the seam width and join the flat overlapping first and second stitchable materials.

In illustrative embodiments, a person operating a sewing machine can place a second stitchable material on a sewing machine deck to cause notches formed in the second stitchable material (or other markings provided on the second stitchable material) to lie under an edge of the overlapping first stitchable material. During the sewing process, the machine operator moves the first stitchable material downwardly toward and over a notched edge of the second stitchable material to, in succession, match each alignment line on the first stitchable material with a companion one of the notches formed in the second stitchable material while causing the first and second stitchable materials to lie in flat overlapping relation to one another as stitches are formed in a joining region (at the seam) to join the first stitchable material to the second stitchable material.

In illustrative embodiments, any alignment markings (e.g., lines) formed on a top surface or edge of the first stitchable material in accordance with the present disclosure are either temporary (i.e., removed after completion of the sewing process) or invisible to the naked eye (i.e., seen only by a sewing operator using suitable vision aid equipment). In this manner, no alignment markings on the top surface or edge of the first stitchable material will be visible to an observer after the sewing process has been completed and upholstery comprising the joined first and second stitchable materials is installed in a vehicle or other suitable environment.

In illustrative embodiments, a series of stitches used in the sewing process cooperate to define a flat seam suitable for use in joining one material to another material to form upholstery or other covering. In illustrative embodiments, such upholstery or other covering is configured to be mounted in an interior cabin of a vehicle, for example, on a passenger seat.

Additional features of the disclosure will become apparent to those skilled in the art upon consideration of the following detailed description of illustrated embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
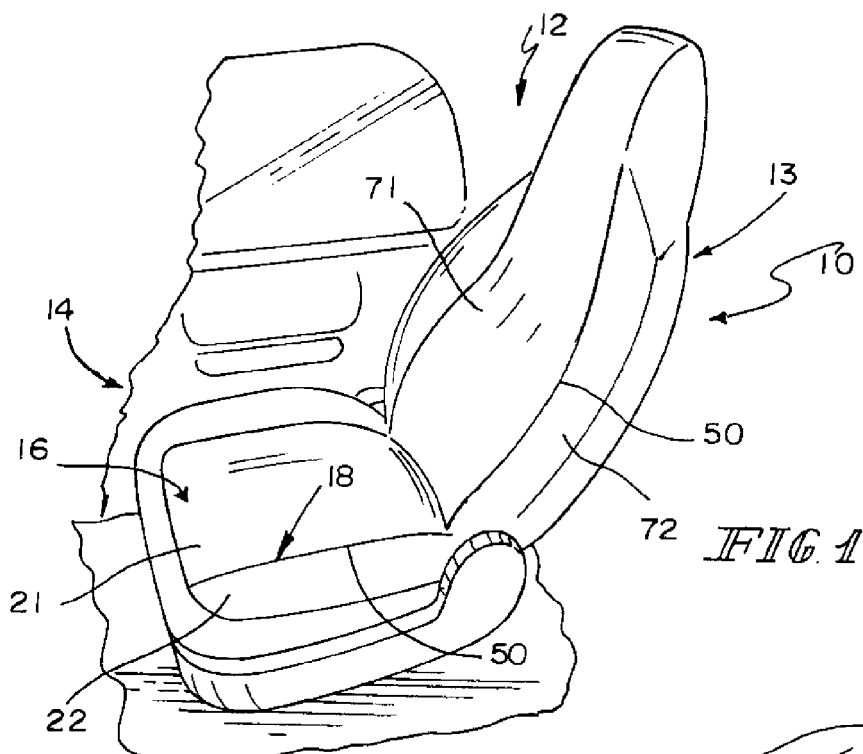
FIG. 1 is a perspective view of a passenger seat comprising stitchable materials joined by a multi-needle (flat) seam using an alignment system in accordance with the present disclosure.

A passenger seat 10 in an interior cabin 12 of a vehicle 14 includes upholstery 16 comprising a first stitchable material 21 and a second stitchable material 22 as suggested in FIG. 1. These materials 21, 22 are joined in flat overlapping relation at a joining region 18 using an alignment system 20 in accordance with the present disclosure in a manner shown, for example, in FIGS. 2-4 to produce a section of upholstery 14. Use of alignment system 20 facilitates and supports joinder of first and second stitchable materials 21, 22 using a multi-needle (flat) seam 50 as suggested in FIGS. 9 and 10.

Figure 2:
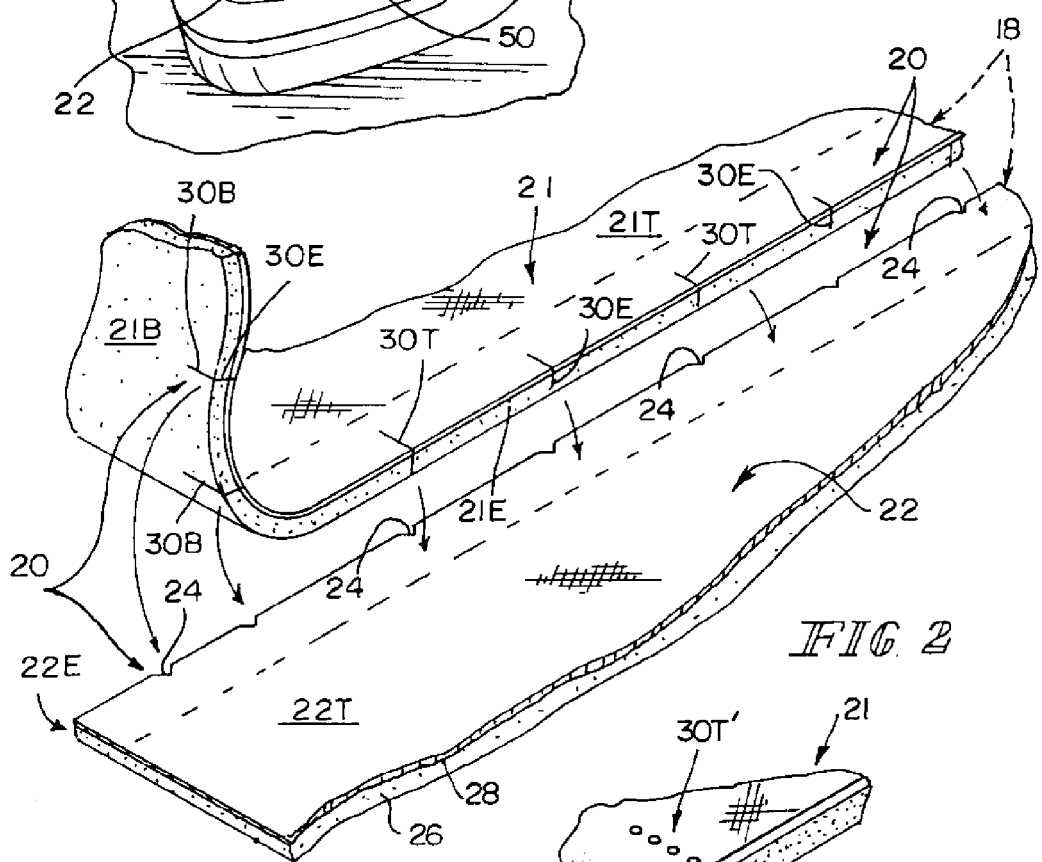
FIG. 2 is an enlarged perspective assembly view showing a first stitchable material arranged to be moved downwardly toward a neighboring second stitchable material formed to include a series of notches on a left edge thereof during a sewing process in accordance with the present disclosure and showing formation of four alignment lines on a top surface of the first stitchable material, seven alignment lines along an edge of the first stitchable material, and two alignment lines along a bottom surface (of an upturned portion) of the first stitchable material in accordance with the present disclosure.

Second stitchable material 22 is formed to include a series of notches 24 along a left edge 22E as shown, for example, in FIG. 2. Notches 24 are arranged to lie in spaced-apart relation to one another along the length of left edge 22E. In illustrative embodiments, notches 24 are formed in any suitable spacing pattern along left edge 22E during a die-cutting operation used to define the perimeter shape of second stitchable material 22. It is within the scope of the present disclosure to replace notches 24 with any suitable markings provided on second stitchable material 22 or holes formed in second stitchable material 22. It is also within the scope of the present disclosure to provide each notch 24 with a V-shape, a U-shape, or any other suitable shape. In the illustrated embodiment, second stitchable material 22 includes an inner sheet 26 made of a cushion material and an outer sheet 28 made of a cloth, leather, simulated leather, or other suitable material. Any suitable material(s) can be used to form second stitchable material 22 within the scope of the present disclosure. Second stitchable material 22 includes a top surface 22T arranged to face toward first stitchable material 21 and provided by inner sheet 24 as suggested in FIG. 2.

Figure 2A:
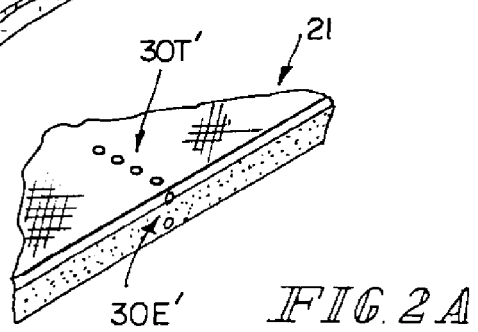
FIG. 2a is a view of a portion of a first stitchable material including an alignment marking in accordance with another embodiment of the present disclosure wherein the alignment marking comprises a symbol or a series of symbols.
Figure 3:
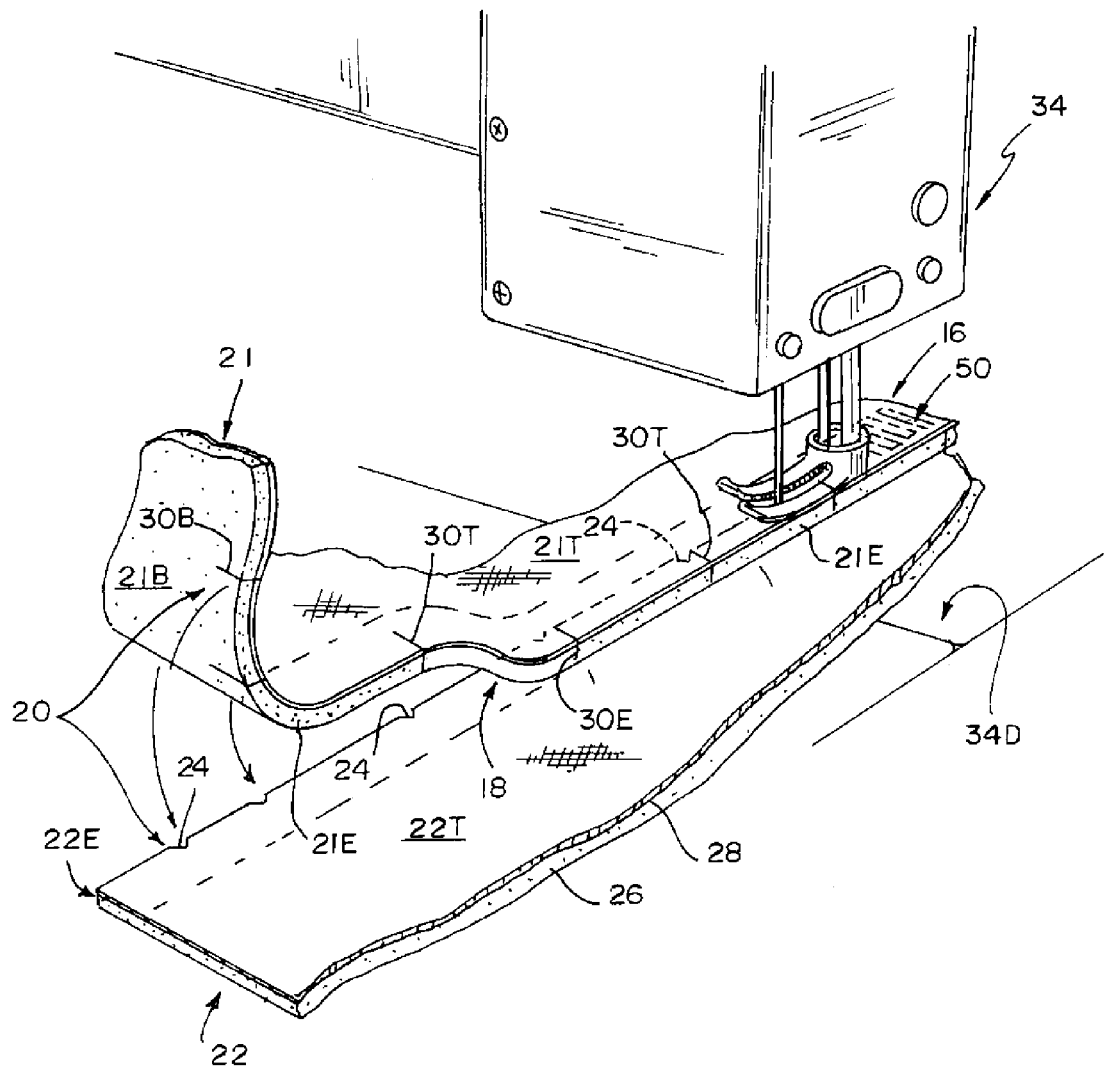
FIG. 3 is a perspective view similar to FIG. 2 showing how each alignment line on the first stitchable material is matched with a companion notch formed in the second stitchable material by a machine operator during a sewing process in accordance with the present disclosure to join the flat overlapping first and second stitchable materials in a joining region using, for example, a multi-needle (flat) seam of the type shown in FIGS. 9-11.
Figure 4:
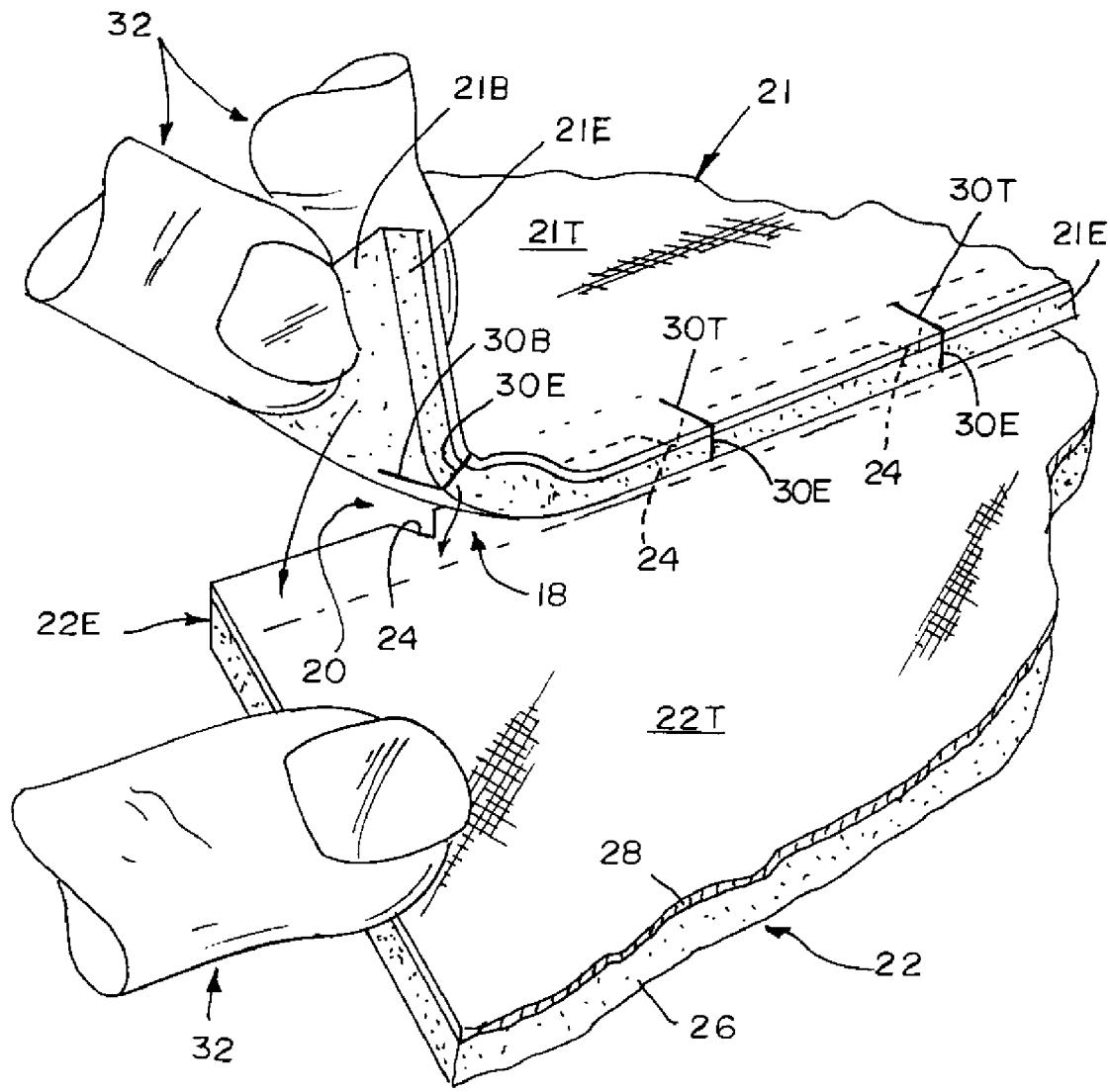
FIG. 4 shows the illustrative alignment process of FIG. 3 in more detail.

Alignment markings in accordance with the present disclosure (e.g., top alignment lines 30T, edge alignment lines 30E, and bottom alignment lines 30B) are provided on first stitching material 21 in accordance with the present disclosure as suggested in FIGS. 2-4. Each of the alignment markings is matched with a companion one of the notches 24 formed in the neighboring second stitchable material 22 by a sewing machine operator 32 as suggested in FIG. 4 in accordance with the present disclosure to align first stitchable material 21 in a proper flat overlapping relation to second stitchable material 22 before a sewing machine 34 is operated to establish a seam 50 joining first and second stitchable materials 21, 22 as suggested in FIG. 3. In the illustrated embodiment, each of the alignment markings on first stitchable material 21 is a line as suggested in FIGS. 2-4. It is within the scope of the present disclosure to replace each line with a symbol (e.g., circle, square, diamond, triangle, etc.) or a series of symbols 30T', 30E' as suggested in FIG. 2a.

First stitchable material 21 includes a top surface 21T arranged to face away from second stitchable material 22 and an opposite bottom surface 21B arranged to face toward top surface 22T of second stitchable material 22 as suggested in FIG. 2. Top alignment line 30T is applied to top surface 21T and bottom alignment line 30B is applied to bottom surface 21B in a material-marking step carried out in advance of a material-sewing step. First stitchable material 21 also includes an edge 21E arranged to extend from top surface 21T to bottom surface 21B and edge alignment lines 30E are applied to edge 21E in such a material-marking step. In accordance with the present disclosure, alignment lines illustratively are line segments that are applied to one or more of surfaces 21T, 21B, or 21E at the option of an upholstery construction designer in accordance with the present disclosure.

In the illustrated embodiment, first stitchable material 21 includes an inner sheet 36 made of a cushion material and an outer sheet made of a cloth, leather, simulated leather, or other suitable material. Any suitable material(s) can be used to form first stitchable material 21 within the scope of the present disclosure. In illustrative embodiments, top surface 21T is provided by outer sheet 38, bottom surface 21B is provided by inner sheet 36, and edge 21E is provided by perimeter portions of inner and outer sheets 36, 38 as suggested in FIGS. 2-4.

First and second stitchable materials 21, 22 are joined at a seam 50 with stitches in accordance with the present disclosure as shown, for example, in FIGS. 2-4. The section of upholstery 16 produced by joining first and second stitching materials 21, 22 is used in a seat bottom 11 of passenger seat 10 as shown, for example, in FIG. 1. Thread is used in a sewing process to produce a series of stitches coupled to first and second stitchable materials as suggested in FIGS. 9 and 10.

In illustrative embodiments, alignment lines are applied to one or more of a top surface 11T, a bottom surface 21B, or an edge 21E of a first stitchable material as suggested in FIG. 204. Each alignment line on first stitchable material 21 can be placed next to a companion notch 24 formed in a neighboring second stitchable material 22 to align first and second stitchable materials 21, 22 properly with one another during a sewing operation as suggested in FIG. 204. In that operation, the aligned first and second stitchable materials 21, 22 are joined with stitches.

An alignment system in accordance with the present disclosure is used to establish a multi-needle (flat) seam 50 that joins a first stitchable material 21 that is arranged to extend over and cover an edge 22E of a neighboring second stitchable material 22 to lie in overlapping and flat relation to second stitchable material 22 as suggested in FIGS. 3 and 4. In a flat seam, multiple needles are used to form stitches that extend across the seam width and form a seam 50 joining the flat overlapping first and second stitchable materials 21, 22 as suggested in FIG. 3.

As suggested in FIG. 3, a person 32 operating a sewing machine 34 can place a second stitchable material 22 on a sewing machine deck 34D to cause notches 24 formed therein to lie under an edge of the overlapping first stitchable material 21. During the sewing process, machine operator 32 moves first stitchable material 21 toward and over the notched edge 22E of second stitchable material 22 to, in succession, match each alignment line on first stitchable material 21 with a companion one of the notches 24 formed in second stitchable material 22 while causing first and second stitchable materials 21, 22 to lie in flat overlapping relation to one another as stitches are formed in a joining region 18 (at the seam 50) to join first stitchable material 21 to second stitchable material 22. It is within the scope of the present disclosure to align other suitable markings provided on first stitchable material 21 with suitable alignment features provided on or formed in second stitchable material 22.

In illustrative embodiments, a series of stitches used in the sewing process cooperate to define a flat seam 50 suitable for use in joining one material 21 to another material 22 to form upholstery 16 or other covering. In illustrative embodiments, such upholstery 16 or other covering is configured to be mounted in an interior cabin 12 of a vehicle 14, for example, on a passenger seat 10.

It is within the scope of the present disclosure to provide an alignment mark on only one of the top and bottom surfaces and edge as suggested in FIGS. 5A and 6-8. It is also within the scope of the present disclosure to form alignment marks on a first stitching material in accordance with the present disclosure along curved perimeter edges as suggested in FIGS. 5A and 6-8.

As suggested in FIG. 1, first and second stitchable materials 71, 72 are joined in flat overlapping relation using an alignment system in accordance with the present disclosure to produce another section of upholstery used, for example, in a seat back 13 of passenger seat 10. Second stitchable material 72 is formed to include notches 24 along a curved exterior edge 72E thereof as suggested in FIG. 5B. First stitchable material 71 includes a curved exterior edge 71E as suggested in FIGS. 5A and 6-8.

Figure 5A:
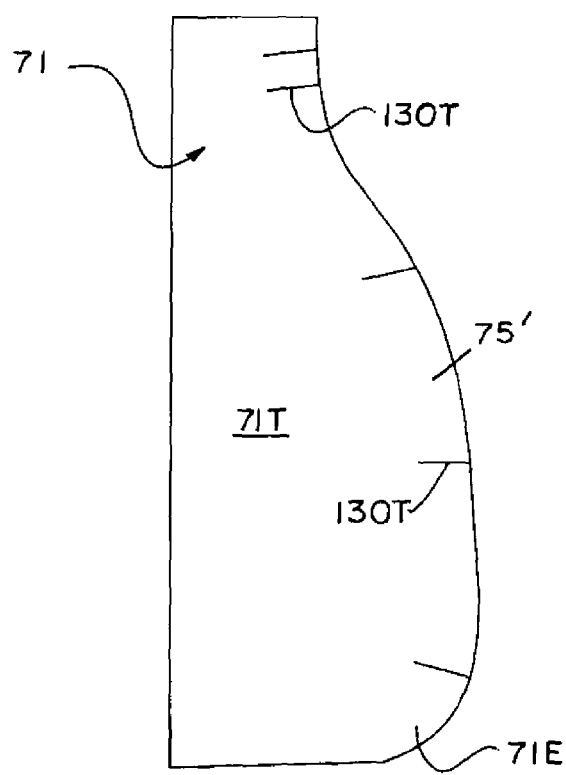
FIG. 5A is a top view of another first stitchable material having a curved exterior edge and alignment lines in accordance with the present disclosure provided on a top surface thereof along the curved exterior edge.
Figure 6:
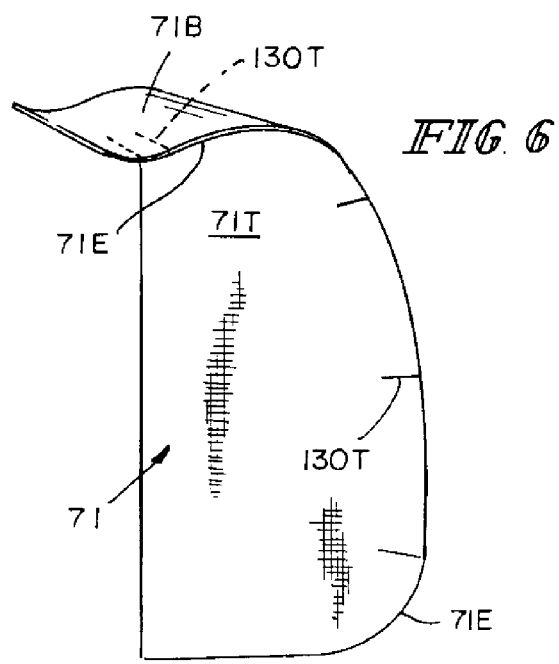
FIG. 6 is another view similar to FIG. 5A suggesting that alignment lines are provided only on the top surface of that first stitchable material.

In a first embodiment suggested in FIGS. 5A and 6, alignment lines 130T are placed only on a top surface 71T of first stitchable material 71 and spaced to match companion notches 24 formed in second stitchable material 72 during a sewing operation in accordance with the present disclosure. In an alternative second embodiment, alignment lines 130B are placed only on a bottom surface 71B of first stitchable material 71' as suggested in FIG. 7. In an alternative third embodiment, alignment lines 130E are placed only on an edge 71E of first stitchable material 71" as suggested in FIG. 8.

Use of an alignment line on a first stitchable material 21 providing a top cover part in combination with a companion notch 24 formed in a second stitchable material 22 providing a bottom cover part in accordance with the present disclosure ensures that the alignment features are not visible in the completed upholstery 16 and do not promote edge deviation on the cover parts during a material joining and assembly process. As suggested, an edge portion of top cover part provided by first stitching material 21 overlaps and lies on an edge portion of an underlying bottom cover part provided by second stitching material 22.

The use of a lower notch 24 on the lower second stitchable material 22 to align directly with an upper alignment line provided on the upper first stitchable material 21 in accordance with the present disclosure avoids formation of unwanted divots on the top cover part. Such divots represent deviations or breaks that interrupt and mar the surface of the upholstery 16 formed by joining first and second stitchable materials 21, 22 at flat seam 50. Alignment lines 130T on top surface 71T are formed using infrared markings or washable ink in illustrative embodiments so as to be invisible after joining of first and second stitchable materials 21, 22.

Alignment features on first stitchable material 21 in accordance with the present disclosure function to cooperate with companion alignment features (e.g., notches 24) formed in second stitchable material 22 and hidden under first stitchable material 22 in joining region 18 to align first and second stitchable materials 21, 22 positively while posing no possibility of degrading the top visible surface of upholstery 16 made using materials 21, 22 in the joining region at the seam 50. Such alignment features provide a direct correlation between first and second stitchable materials 21, 22. The direct correlation between materials 21, 22 is visible on the backside of the assembled parts 21, 22. This provides a specific aligned point which can be measured and permits the quality of the joined materials at the seam to be controlled during a quality inspection.

In the field of automotive upholstery, a flat-seam construction may be used in accordance with the present disclosure to join portions of materials used in automotive upholstery applications, such as vehicle seat coverings (see, for example, FIG. 1, described herein), door panels, consoles, armrests, sun visors, headrests, instrument panels, and the like. Thus, although flat-seam construction on automotive upholstery arrangements has been carried out using either a single join or a join with Deck-seam construction or a join with a French-seam construction, flat-seam construction may be used in accordance with the present disclosure to join portions of automotive upholstery with a single process, thereby minimizing salvage, waste, and other unnecessary material overlap.

A joining region 18 is defined by a portion of first stitchable material 21 overlapping a portion of second stitchable material 22 whereupon the flat-seam construction 50 is formed. Forming the flat-seam construction 50 in the joining region 18 in accordance with the present disclosure results in a substantially flat seam 50 coupled to the two stitchable materials 21, 22 to join first stitchable material 21 to second stitchable material 22. This technique obviates any requirement for multiple operations and manipulation of the stitchable materials. Arrangement of threads in the flat-seam construction 50 as disclosed herein allows for two adjacent materials to be joined only at a joining region 18 using a series of suitable stitches.

Figure 9:
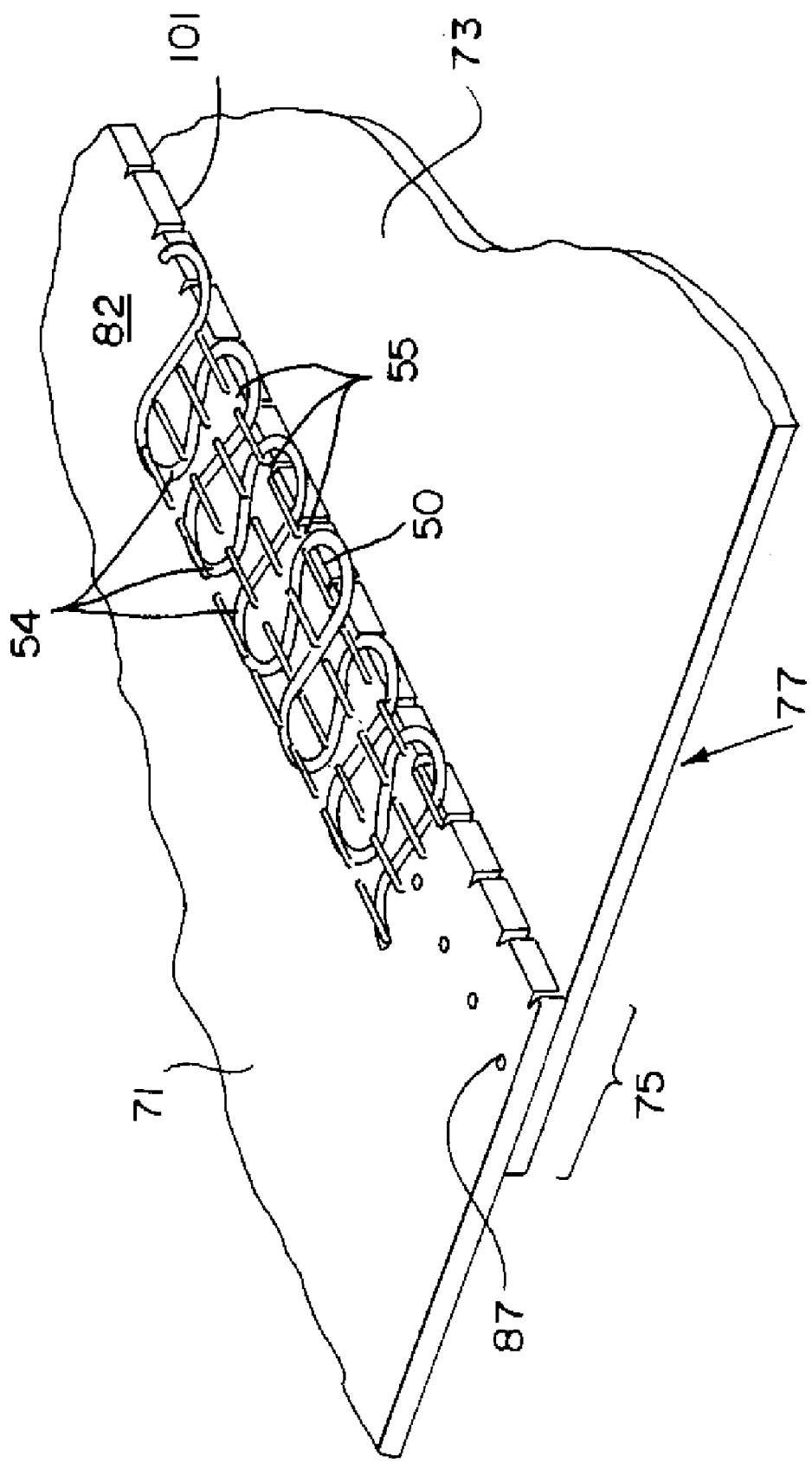
FIG. 9 is a perspective view of a flat seam established on the first and second stitchable materials of FIGS. 2-4 in accordance with the present disclosure.
Figure 10:
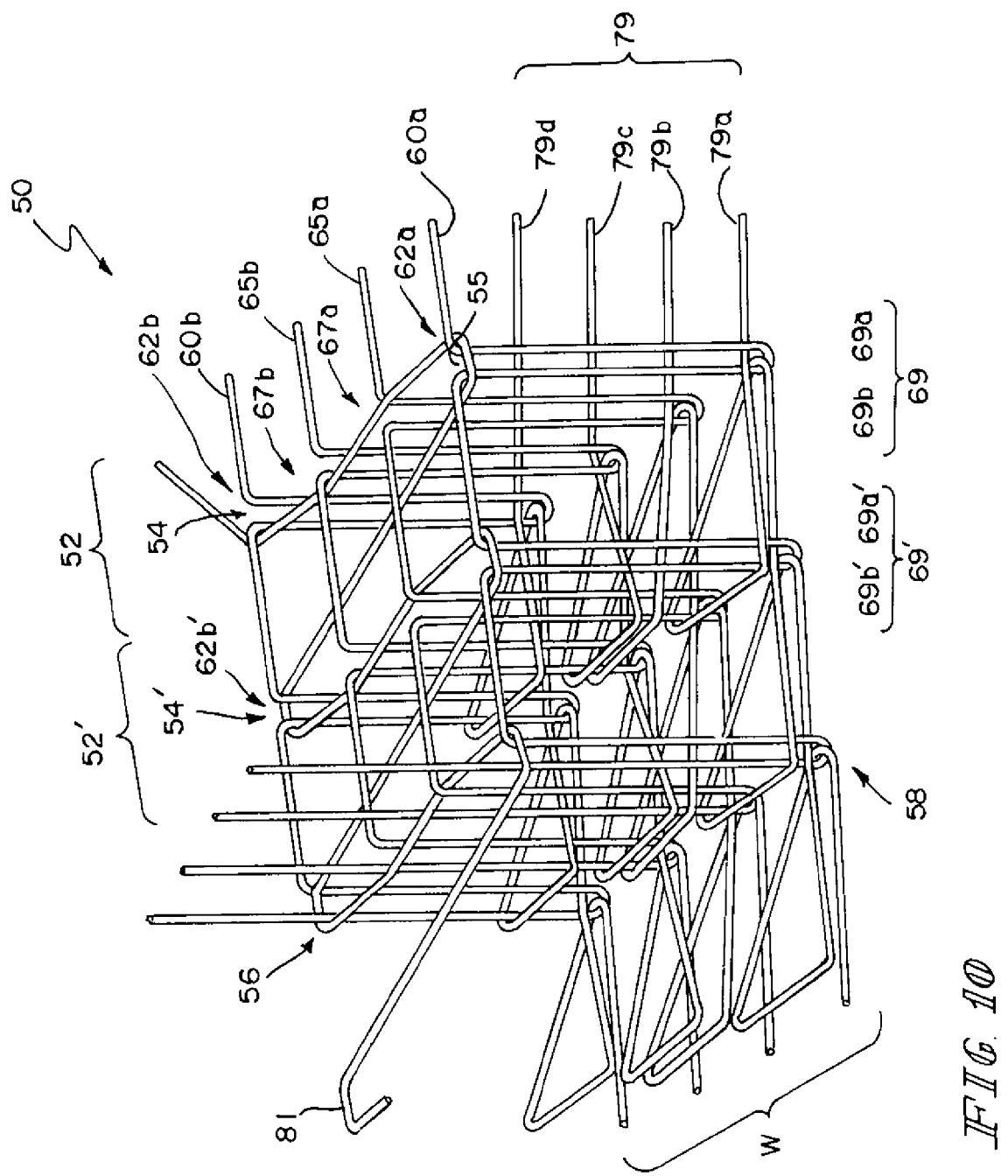
FIG. 10 is a diagrammatic perspective assembly view showing an illustrative multi-needle (flat) seam in accordance with the present disclosure showing illustrative stitches included therein.

One example of a flat-seam construction 50 is formed as suggested in FIGS. 9 and 10 on a portion of one or more, and preferably the two, stitchable automotive upholstery materials 21 and 22. The flat-seam construction 50 is formed at a joining region 18 associated with two stitchable materials 21, 22 on passenger seat 10. The flat-seam construction 50 is generally formed using a number of sequentially formed stitches 52 and 52' as shown, for example, in FIGS. 9 and 10. Each successive stitch 52 and 52' may be formed and applied to the one or more stitchable materials. Each successive stitch 52 and 52' may be substantially identical to its preceding stitch, although variations between stitches are contemplated by the present disclosure. Flat-seam construction 50 as shown in FIG. 10 is shown schematically for ease of illustration and understanding. In an illustrative practice, the flat-seam construction 50 is substantially flat such that a top surface 56 of the flat-seam construction 50 and a bottom surface 58 of the flat-seam construction 50 are separated only by the thickness of the material(s) (e.g., first and second stitchable materials 21, 22) to which the stitches are applied.

Each stitch 52 and 52' comprises two outer threads 60a and 60b, formed into a first outer thread loop 62a and a second outer thread loop 62b, and at least one inner thread formed into at least one inner thread loop 67. According to the exemplary construction illustrated in FIG. 10, the at least one inner thread 65 comprises two inner threads 65a and 65b, formed into two inner thread loops 67a and 67b. The first outer thread loop 62a and the second outer thread loop 62b may be spaced to define a width of the flat-seam construction 50. The two inner thread loops 67a and 67b may be positioned to lie between the first and second outer thread loops 62a and 62b.

The inner thread loops 67a and 67b, and the two outer thread loops 62a and 62b may be substantially parallel to each other, and substantially evenly spaced across the width of the flat-seam construction 50.

Each of the inner thread loops 67a and 678 and the outer thread loops 62a and 62b may transversely penetrate the one or more stitchable materials (not shown) on a top surface 56 of the flat-seam construction 50 at respective penetration points 54 and 55 thereof. Each of the inner thread loops 67a and 67b and the outer thread loops 62a and 62b has a respective bight portion 69 engaging a bottommost surface 77 of the joining region 18 of the first and second stitchable materials 21 and 22. The bottommost surface 77 is substantially coplanar with the bottom surface 58 of the flat-seam construction 50. The respective bight portions 69 define a loop at the bottom surface 58 of the flat-seam construction 50 to engage the bottommost surface 77, and may be held thereon by at least one looper thread 79.

According to the example of flat-seam construction illustrated in FIG. 10, the at least one looper thread 79 may comprise, for example, four looper threads 79a, 79b, 79c, and 79d. Each of the looper threads 79a-79d may be arranged to be substantially coplanar with the bottommost surface 77 of the at least one stitchable material 21 and 22. Each looper thread 79a-79d may pass between the bottommost surface 77 and the respective bight portion 69 of each of at least one of the thread loops 62a, 62b, 67a, 67b to thereby engage the respective bight portion 69 and to secure the respective bight portion 69 to the bottommost surface 77.

Described now with reference to a first looper thread 79a, but applicable to each looper thread 79a-79d, is the structure and interaction of the looper threads 79 with the respective bight portion 69. Each stitch 52 has a first looper thread 79a extending through the bight portion 69a of the first outer thread loop 62a. Thereafter, the first looper thread 79a extends around the bight portions 69a' and 69b' of a subsequent stitch 52' and extends diagonally back through the bight portion 69a of the stitch 52 as shown in FIG. 10. This looping arrangement repeats itself, as the first looper thread 79a subsequently extends through the bight portion 69a' of the subsequent stitch 52'. As shown in FIG. 10, looper threads 79b, 79c, and 79d extend through the bight portions 69b, 69c, and 69d respectively, and loop around respective bight portions 69 thereby to secure the thread loops 62a, 62b, 67a, and 67b in engaging relationship bottommost surface 58.

Arranged on a top surface 56 of the flat-seam construction 50 may be at least one decorative thread, which may comprise, e.g., a decorative thread 81 in the embodiment illustrated in FIG. 10. Such a decorative thread 81 may be visible on a topmost surface 82 as shown in FIG. 9 of the joining region 18 of first and second stitchable materials 21 and 22. As shown in FIG. 10, the decorative thread 81 may extend laterally across seam 50, and is secured by looping around at least one of the first and second outer thread loops 62a and 62b at a penetration point 54 thereof. The decorative thread 81 may also loop around the second outer thread loop 62b at the penetration point 54, extend laterally across to loop around the first outer thread loop 62a at a penetration point 55, and extend diagonally to loop around an outer thread loop 62b' of the subsequent stitch 52', as shown in FIG. 10, before repeating the above-mentioned arrangement. In this manner, decorative thread 81 forms a serpentine pattern along the length of the flat-seam construction 50 as illustrated in FIG. 9. Decorative thread 81 may take any suitable form and be produced to provide a generally aesthetic view to the topmost surface 82 of the joining region 18.

With this understanding of one example of a flat-seam construction in mind, description is now provided of various alignment mechanisms and methodologies for alignment of materials joined together using flat-seam construction in accordance with the present disclosure.

As illustrated in FIGS. 5A-8, various alternative alignment mechanisms may be used to provide improved and positive alignment between upper and lower stitchable materials 71, 72. In accordance with each of the disclosed implementations of the alignment mechanisms, a plurality of alignment features are provided on each of the first and second stitchable materials 21, 22. As shown in FIG. 5A, first stitchable material 71 (e.g., a top cover part in an illustrative automobile upholstery embodiment) includes a plurality of straight lines 130T positioned at various locations along the region 75' that constitutes that portion of first stitchable material 71 that eventually becomes part of joining region 18. Likewise, as shown in FIG. 5B, second stitchable material 72 (e.g., a lower cover part in the automobile upholstery) includes a plurality of V-shaped notches 24 or suitable alignment features, each corresponding to and associated with a companion one of the straight lines 130T and positioned at locations along the region 75" that constitutes that portion of the first stitchable material 72 that eventually becomes part of joining region 18.

Figure 5B:
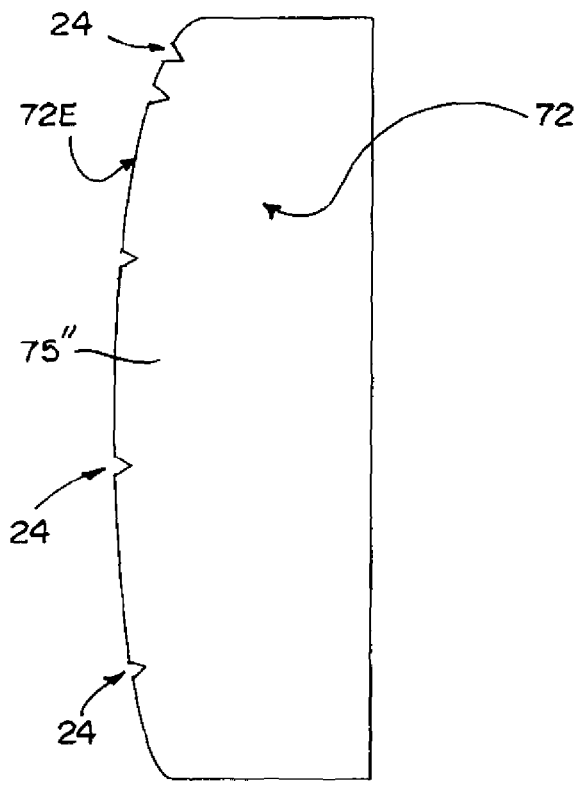
FIG. 5B is a top view of another second stitchable material having a curved exterior edge and showing formation of notches in the second stitchable material to open at various points along that curved exterior edge.

The general interaction of the lines 130T on first stitchable material 71 and notches 24 on second stitchable material 72 is suggested, for example, in FIGS. 5A and 5B. The use of lower V-shaped notches 24 on second stitchable material 72 enables direct, visual alignment with a companion straight line 130T on first stitchable material 71. This is because the upper straight line 130T formed on first stitchable material 71 extends into the corresponding notch 24 formed in second stitchable material 72. As a result, the interaction between the features 130T, 24 on the corresponding materials 71, 72 enable a user or assembler to align the features 130T, 24 on the corresponding edges of the first and second stitchable materials 71, 72 positively. This is because the interaction between notches 24 and line 130T enable the assembler to see the corresponding lines and to align those lines with the apex of the V-shape or inverted notch so as to provide proper alignment of the first and second stitchable materials 71, 72.

Various alternative implementations of the alignment methodology disclosed herein can use various different types of alignment features that differ in both character and location. Each of these different alignment features may be included in a first stitchable material 71 (e.g., top cover part or other optional textile surface) in accordance with the present disclosure, depending on the upholstery application and constituent materials.

In an embodiment shown in FIG. 6, the markings 130T are provided on the upper surface 71T of first stitchable material 71 (e.g., top cover part). In such an embodiment, an indication of the location of notches 24 formed in second stitchable material 72 may be provided via infrared marking to enable an assembler to locate notches 24 in the material 72 without having to fold back first stitchable material 71 overlapping that second stitchable material 72. Alternatively, the assembler may simply fold or curl back first stitchable material 71, respectively, prior to joining them using flat-seam construction 50.

Figure 7:
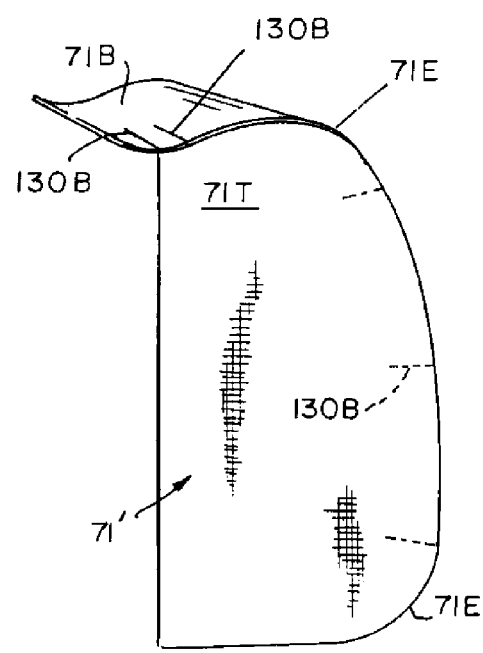
FIG. 7 is a view similar to FIG. 6 of another first stitchable material wherein alignment lines in accordance with the present disclosure are provided only on the bottom surface of that first stitchable material.

For example, as illustrated in FIG. 7, a first stitchable material 71' providing a top cover part (or intermediate top cover part requiring stitching to a lower cover part) may include its bottom surface 71B of first stitchable material 71' including the extended lines 130B (e.g., marking). In such an embodiment, an indication of the location of the markings 130B on the first stitchable material 71' and/or the notches 24 formed in the second stitchable material 72 may be provided via infrared marking to enable an assembler to locate the notches 24 in the material 72 (as illustrated in FIG. 5B) without having to fold back first stitchable material 71' (e.g., the top cover part) overlapping that second stitchable material 72 (e.g., the bottom cover part). Such infrared (IR) marking may be provided via IR inks that are completely invisible to the human eye yet can be seen by using a device which can see in the IR range—such as with a modified camera or other suitable vision system. The inks do not fluoresce in the visible range, cannot be seen with ultraviolet lights and cannot be seen by the human eye alone (the human eye can see from about 400 nm (violet) to about 700 nm (red)—above 700 nm is the IR range). Alternatively, the assembler may need to curl back the textile of the first stitchable material 71' to enable alignment of the lines 130B or other markings on the underside 71B (e.g., backside) of first stitchable material 71 with the notches 24 on second stitchable material 72.

This interaction between the lines 130B of first stitchable material 711 of FIG. 7 (e.g., top cover part) and notches 24 of second stitchable material 72 of FIG. 5B (e.g., lower cover part) takes place on the surface of the joining region 18 that constitutes the underside of the seam 50. As a result, the alignment mechanisms and their constituent features illustrated in FIG. 7 are not visible on the exterior of the assembled upholstery product 16.

Figure 8:
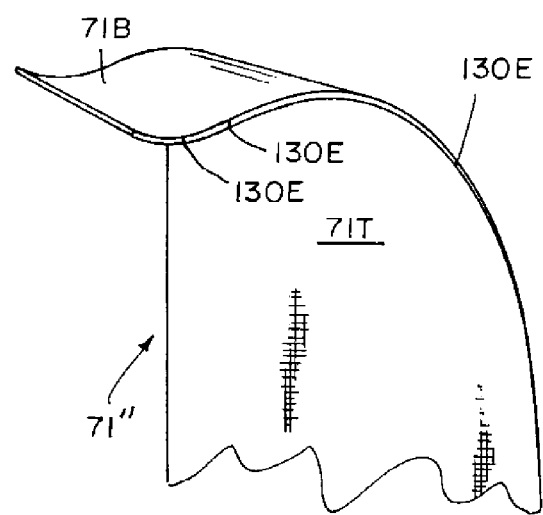
FIG. 8 is a view similar to FIGS. 6 and 7 of yet another first stitchable material wherein alignment lines in accordance with the present disclosure are provided only on the edge of that first stitchable material.

As a further alternative, the extended lines may be included on an edge of first stitchable material 71'. For example, as illustrated in FIG. 8, a first stitchable material 71" may include a lower surface 71B, an upper surface 71T, and an edge 71E extending therebetween, wherein the extended lines (e.g., markings 130E) are provided on edge 71E. Such an implementation may have particular utility when there is increased ability to detect the location of the lines visually on edge 71E (e.g., the color of the edge is different than that of the lower or upper surfaces 71B, 71T and/or the edge 71E is of a particular minimum thickness). Moreover, in such an implementation, there be less or no need to curl back the material of first stitchable material 71 to locate the lines or other markings for proper alignment of the material parts 71, 72.

Alignment lines illustrated in FIGS. 5A-8 may be provided or marked using any number of techniques in accordance with the present disclosure including the use of ink jet, airbrush, burnishing, laser, or infrared marking Markings may either be permanent or washable within the scope of the present disclosure. Further, the markings may be rendered via invisible (e.g., IR) or fading ink or other media within the scope of the present disclosure. Alignment lines may also be placed by a Computer Numerically Controlled (CNC) automated cutter, by manual process, or by alignment in dedicated fixture to complete the marking process within the scope of the present disclosure.

Specific sizes and dimension of notch and alignment line features may be specified on a standard basis or based on a specified individual material or lamination requirement. Moreover, the alignment features present on the top cover part are not limited to lines and the alignment features on the lower cover part are not limited to a V-shaped notch. The alignment features in accordance with the present disclosure may be configured in any manner that enables alignment of the cover parts prior to and, as part of, flat-seam manufacture.

Other embodiments and implementations of flat-seam construction may be implemented in association with the alignment mechanisms and methodologies disclosed herein in accordance with the present disclosure. For example, the mechanisms and methodologies may be implemented in conjunction with other embodiments illustrated in U.S. patent application Ser. No. 12/535,995, filed Aug. 5, 2009 (hereinafter the '995 application) including those disclosed, for example, in conjunction with FIGS. 2-3 and 7 of the '995 application. Moreover, the alignment mechanisms and methodologies disclosed herein may be implemented in conjunction with an optional integrated tape element 89 disclosed in conjunction with FIG. 5 of the '995 application to hide the alignment holes, slits, or other markings As a result, such a tape element may be provided to cover any portion of the bare layer or substrate material which may be visible through the flat-seam construction 50. In such an implementation, the substrate material may serve as an inner core in automotive seating applications to which the upholstery cover is applied. Accordingly, the tape element may be integrated easily within the flat-seam construction 50 by positioning the tape element 89 over the joining region 18 and adapting the flat-seam construction 50 to join first stitchable material 71, second stitchable material 72, and tape element 89. Additional layers may also be added and integrated readily into a flat-seam construction and corresponding alignment mechanisms used therein in accordance with the present disclosure.

Where integrated elements are introduced, such as the tape elements described above, these act as a third material position atop the two adjacent materials. As such, additional layers of materials or elements integrated within the flat-seam construction can be aligned easily without the need to manipulate the orientation of the materials or introduce additional steps in the stitching process.

Further, while the flat-seam construction alignment mechanisms and methodologies of the present disclosure have been described with regards to automotive upholstery covers, it is within the scope of the present disclosure that the flat-seam construction may be used for decorating or joining other elements within automobiles, or other transportation systems, or elsewhere, where strong, resilient flat-seam construction is needed and can be applied advantageously in a single step process. For example, in order to provide generally flat surfaces on airbag arrangements, the flat-seam construction of the present disclosure may be used.

The invention claimed is:

1. Upholstery comprising
   first and second stitchable materials,
   a plurality of lines provided in a joining region on an outer surface of the first stitchable material, each of the plurality of lines being a marking on the first stitchable material,
   a plurality of notches provided in a joining region on the second stitchable material, and
   a plurality of sequentially formed stitches cooperate to couple the first and second stitchable materials to one another to establish a flat seam on the first and second stitchable materials,
   wherein the plurality of lines and plurality of notches are mated such that each of the plurality of lines provided on the first stitchable material is positioned to be aligned with a companion one of the plurality of notches provided in the second stitchable material, thereby enabling alignment of the first and second stitchable material portions in a manner to establish an alignment mechanism for alignment of the first and second stitchable materials that further enables formation of the flat seam which comprises a plurality of sequentially formed stitches.

2. The upholstery of claim 1, wherein as part of alignment, the joining regions of the first and second stitchable materials are overlapped with one another and aligned based on positions of the plurality of lines and plurality of notches to receive the plurality of sequentially formed stitches to join the first stitchable material and the second stitchable material.

3. The upholstery of claim 2, wherein the first stitchable material includes a bottom surface contacting a top surface of the second stitchable material and a top surface facing away from the top surface of the second stitchable material and the plurality of lines are provided on the top surface of the first stitchable material.

4. Upholstery comprising
   first and second stitchable materials,
   a plurality of first alignment features provided in a joining region on the first stitchable material, each of the first plurality of alignment features being a marking on the first stitchable material,
   a plurality of second alignment features provided in a joining region on the second stitchable material, and
   a plurality of sequentially formed stitches cooperate to couple the first and second stitchable materials to one another to establish a flat seam on the first and second stitchable materials,
   wherein the first and second pluralities of alignment features are mated such that each of the first alignment features provided on the first stitchable material is positioned to be aligned with a companion one of the second alignment features provided in the second stitchable material, thereby enabling alignment of the first and second stitchable material portions in a manner to establish an alignment mechanism for alignment of the first and second stitchable materials that further enables formation of the flat seam which comprises a plurality of sequentially formed stitches,
   wherein as part of alignment, the joining regions of the first and second stitchable materials are overlapped with one another and aligned based on positions of the plurality of first and second alignment features to receive the plurality of sequentially formed stitches to join the first stitchable material and the second stitchable material,
   wherein the first stitchable material includes a bottom surface contacting a top surface of the second stitchable material and a top surface facing away from the top surface of the second stitchable material and the plurality of first alignment features is provided on the top surface of the first stitchable material, and
   wherein each of the plurality of first alignment features comprises indicator means for providing a marking on the top surface of the first stitchable material that is visible to a sewing person using the alignment features during a sewing process and during alignment of the first stitchable material relative to the second stitchable material and formation of the flat seam on the first and second stitchable materials and is invisible to a person viewing the top surface of the first and second stitchable materials after formation of the flat seam.

5. The upholstery of claim 4, wherein the indicator means is established on the top surface of the first stitchable material using infrared marking visible to the sewing person using an infrared vision system during the sewing process and invisible to all observers unaided by the infrared vision system.

6. The upholstery of claim 4, wherein the indicator means is established by a temporary washable ink that is removed from the top surface of the first stitchable material after formation of the flat seam on the first and second stitchable materials.

7. The upholstery of claim 4, wherein the indicator means is a line.

8. The upholstery of claim 4, wherein the indicator means is one of a symbol and a series of symbols.

9. The upholstery of claim 1, wherein the first stitchable material includes a bottom surface contacting the second stitchable material and a top surface facing away from the second stitchable material and the plurality of lines are provided on the bottom surface of the first stitchable material.

10. Upholstery comprising
    first and second stitchable materials,
    a plurality of first alignment features provided in a joining region on the first stitchable material, each of the first plurality of alignment features being a marking on the first stitchable material,
    a plurality of second alignment features provided in a joining region on the second stitchable material, and
    a plurality of sequentially formed stitches cooperate to couple the first and second stitchable materials to one another to establish a flat seam on the first and second stitchable materials,
    wherein the first and second pluralities of alignment features are mated such that each of the first alignment features provided on the first stitchable material is positioned to be aligned with a companion one of the second alignment features provided in the second stitchable material, thereby enabling alignment of the first and second stitchable material portions in a manner to establish an alignment mechanism for alignment of the first and second stitchable materials that further enables formation of the flat seam which comprises a plurality of sequentially formed stitches,
    wherein the first stitchable material includes a bottom surface contacting the second stitchable material and a top surface facing away from the second stitchable material and the plurality of alignment features is provided on the bottom surface of the first stitchable material, and
    wherein each of the plurality of second alignment features is a notch formed in the second stitchable material, each notch is V-shaped to define an apex, and each of the plurality of first alignment features is a line established on the bottom surface of the first stitching material that is aligned with and intersects the apex of a companion one of the notches formed in the second stitching material.

11. Upholstery comprising
    first and second stitchable materials,
    a plurality of first alignment features provided in a joining region on the first stitchable material, each of the first plurality of alignment features being a marking on the first stitchable material,
    a plurality of second alignment features provided in a joining region on the second stitchable material, and
    a plurality of sequentially formed stitches cooperate to couple the first and second stitchable materials to one another to establish a flat seam on the first and second stitchable materials,
    wherein the first and second pluralities of alignment features are mated such that each of the first alignment features provided on the first stitchable material is positioned to be aligned with a companion one of the second alignment features provided in the second stitchable material, thereby enabling alignment of the first and second stitchable material portions in a manner to establish an alignment mechanism for alignment of the first and second stitchable materials that further enables formation of the flat seam which comprises a plurality of sequentially formed stitches, wherein the first stitchable material includes a bottom surface contacting the second stitchable material and a top surface facing away from the second stitchable material and the plurality of alignment features is provided on the bottom surface of the first stitchable material, and wherein each of the plurality of second alignment features is a notch formed in the second stitchable material, the second stitchable material includes a bottom surface facing away from the top surface thereof and each of the plurality of first alignment features formed on the bottom surface is arranged to align with and extend into a companion one of the notches and to be visible to an observer viewing the bottom surfaces of the first and second stitchable materials after formation of the flat seam to facilitate a quality inspection of the alignment of the first and second stitchable materials.

12. The upholstery of claim 1, wherein the first stitchable material includes a bottom surface contacting a top surface of the second stitchable material, a top surface facing away from the top surface of the second stitchable material, and an edge extending between the top and bottom surfaces of the first stitchable material and facing toward the top surface of the second stitchable material, and the plurality of lines are provided on the edge of the first stitchable material.

13. The upholstery of claim 1, wherein the second stitchable material includes a top surface and a bottom surface facing away from the top surface, the first stitchable material includes a bottom surface mating with the top surface of the second stitchable material, a top surface facing away from the bottom surface of the first stitchable material and an edge arranged to interconnect and extend between the top and bottom surfaces of the first stitchable material and face toward a portion of the top surface of the second stitchable material, and the plurality of lines are provided on each of the top and bottom surfaces and the edge of the first stitchable material.

14. The upholstery of claim 13, wherein, as part of alignment, the joining regions of the first and second stitchable materials are overlapped with one another and aligned based on positions of the plurality of first and second alignment features to receive the plurality of sequentially formed stitches to join the first stitchable material and the second stitchable material.

15. The upholstery of claim 13, wherein each of the plurality of the first alignment features is a line segment and each of the line segments provided on the edge is arranged to interconnect companion line segments provided on the top and bottom surfaces of the first stitchable material.

16. Upholstery comprising first and second stitchable materials, a plurality of first alignment features provided in a joining region on the first stitchable material, each of the first plurality of alignment features being a marking on the first stitchable material, a plurality of second alignment features provided in a joining region on the second stitchable material, and a plurality of sequentially formed stitches cooperate to couple the first and second stitchable materials to one another to establish a flat seam on the first and second stitchable materials, wherein the first and second pluralities of alignment features are mated such that each of the first alignment features provided on the first stitchable material is positioned to be aligned with a companion one of the second alignment features provided in the second stitchable material, thereby enabling alignment of the first and second stitchable material portions in a manner to establish an alignment mechanism for alignment of the first and second stitchable materials that further enables formation of the flat seam which comprises a plurality of sequentially formed stitches wherein a location of the plurality of second alignment features is indicated using infrared marking.

17. Upholstery comprising first and second stitchable materials, a plurality of first alignment features provided in a joining region on the first stitchable material, each of the first plurality of alignment features being a marking on the first stitchable material, a plurality of second alignment features provided in a joining region on the second stitchable material, and a plurality of sequentially formed stitches cooperate to couple the first and second stitchable materials to one another to establish a flat seam on the first and second stitchable materials, wherein the first and second pluralities of alignment features are mated such that each of the first alignment features provided on the first stitchable material is positioned to be aligned with a companion one of the second alignment features provided in the second stitchable material, thereby enabling alignment of the first and second stitchable material portions in a manner to establish an alignment mechanism for alignment of the first and second stitchable materials that further enables formation of the flat seam which comprises a plurality of sequentially formed stitches wherein the plurality of first alignment features is formed via one of ink jet and airbrush.

18. Upholstery comprising first and second stitchable materials, a plurality of first alignment features provided in a joining region on the first stitchable material, each of the first plurality of alignment features being a marking on the first stitchable material, a plurality of second alignment features provided in a joining region on the second stitchable material, and a plurality of sequentially formed stitches cooperate to couple the first and second stitchable materials to one another to establish a flat seam on the first and second stitchable materials, wherein the first and second pluralities of alignment features are mated such that each of the first alignment features provided on the first stitchable material is positioned to be aligned with a companion one of the second alignment features provided in the second stitchable material, thereby enabling alignment of the first and second stitchable material portions in a manner to establish an alignment mechanism for alignment of the first and second stitchable materials that further enables formation of the flat seam which comprises a plurality of sequentially formed stitches wherein the plurality of first alignment features is formed via washable ink.

19. Upholstery comprising first and second stitchable materials, a plurality of first alignment features provided in a joining region on the first stitchable material, each of the first plurality of alignment features being a marking on the first stitchable material, a plurality of second alignment features provided in a joining region on the second stitchable material, and a plurality of sequentially formed stitches cooperate to couple the first and second stitchable materials to one another to establish a flat seam on the first and second stitchable materials, wherein the first and second pluralities of alignment features are mated such that each of the first alignment features provided on the first stitchable material is positioned to be aligned with a companion one of the second alignment features provided in the second stitchable material, thereby enabling alignment of the first and second stitchable material portions in a manner to establish an alignment mechanism for alignment of the first and second stitchable materials that further enables formation of the flat seam which comprises a plurality of sequentially formed stitches wherein the plurality of first alignment features is formed via infrared marking.

20. Upholstery comprising first and second stitchable materials, a plurality of first alignment features provided in a joining region on the first stitchable material, each of the first plurality of alignment features being a marking on the first stitchable material, a plurality of second alignment features provided in a joining region on the second stitchable material, and a plurality of sequentially formed stitches cooperate to couple the first and second stitchable materials to one another to establish a flat seam on the first and second stitchable materials, wherein the first and second pluralities of alignment features are mated such that each of the first alignment features provided on the first stitchable material is positioned to be aligned with a companion one of the second alignment features provided in the second stitchable material, thereby enabling alignment of the first and second stitchable material portions in a manner to establish an alignment mechanism for alignment of the first and second stitchable materials that further enables formation of the flat seam which comprises a plurality of sequentially formed stitches wherein the plurality of first alignment features is formed via one of burnishing and laser.

21. The upholstery of claim 1, wherein at least one of the first and second stitchable materials is a covering material for at least one of automotive door panels, automotive consoles, automotive armrests, automotive sun visors, automotive headrests, and automotive instrument panels.

22. A method for aligning first and second stitchable material portions of upholstery materials as part of joining the stitchable material portions via a flat seam, the alignment method comprising the steps of forming a plurality of lines each being a marking in a joining region on an outer surface of the first stitchable material portion, forming a plurality of notches provided in a joining region on the second stitchable material portion, and mating the plurality of lines and plurality of notches such that each line on the first stitchable material is positioned to be aligned with a companion one of the plurality of notches, thereby enabling alignment of the first and second stitchable material portions in a manner that further enables formation of the flat seam, wherein, as part of alignment, the joining regions of the first and second stitchable materials are overlapped with one another and aligned based on positions of the plurality of lines and notches to receive stitches included in the flat seam to join the first stitchable material and the second stitchable material.

23. A method for aligning first and second stitchable material portions of upholstery materials as part of joining the stitchable material portions via a flat seam, the alignment method comprising the steps of forming a plurality of first alignment features in a joining region on the first stitchable material portion, the plurality of first alignment features each being a marking, forming a plurality of second alignment features provided in a joining region on the second stitchable material portion, and mating the pluralities of first and second alignment features such that each marking on the first stitchable material is positioned to be aligned with a companion one of the second alignment features, thereby enabling alignment of the first and second stitchable material portions in a manner that further enables formation of the flat seam, wherein, as part of alignment, the joining regions of the first and second stitchable materials are overlapped with one another and aligned based on positions of the plurality of first and second alignment features to receive stitches included in the flat seam to join the first stitchable material and the second stitchable material, and wherein the flat seam comprises a plurality sequentially formed stitches of each stitch comprising two outer threads, formed into first and second outer thread loops, and at least one inner thread, formed into at least one inner thread loop, the first and second thread loops spaced across a width of the joining region, the at least one inner thread loop being positioned between the first and second outer thread loops, wherein each of the inner and outer thread loops transversely penetrate both the first and second stitchable materials in their respective joining regions and each of said inner and outer thread loops have a bight portion engaging a bottom surface of the first and second stitchable materials, and wherein at least one looper thread formed on, and coplanar with the bottom surfaces of the first and second stitchable materials.

24. A method of aligning and joining first and second portions of upholstery materials comprising the steps of providing first material having an outer top surface, an inner bottom surface and lines being a marking on the bottom surface, providing second material having an outer top surface, an inner bottom surface and notches at an edge, overlapping the first material and second material such that the top surface of the first material faces away from the second material and the top surface of the second material faces the bottom surface of the first material, aligning at least one of the lines on the first material with a notch on the second material, and forming stitches to couple the first and second materials to one another to establish a flat seam on the first and second materials and with the top surface of the first material facing in the same direction as the top surface of the second material.

* * * * *